UNITED STATES PATENT OFFICE.

ROBERT GEORGE FLEMING, SR., OF BLACKFOOT, IDAHO.

EGG-PRESERVER.

1,293,395.     Specification of Letters Patent.     Patented Feb. 4, 1919.

No Drawing.     Application filed December 16, 1915. Serial No. 67,227.

*To all whom it may concern:*

Be it known that I, ROBERT G. FLEMING, Sr., a citizen of the United States, and a resident of Blackfoot, in the county of Bingham and State of Idaho, have made an Improvement in Egg-Preservers, of which the following is a specification.

My invention is a semi-solid composition or compound for application to the shells of fresh eggs, for the purpose of preventing evaporation of the contents of the same, and also excluding oxygen from access to the interior through the pores of the shells and thereby causing early deterioration or decay of the contents.

The composition is formed of five (5) ingredients in the following proportions: two (2) ounces ox fat, one (1) ounce olive-oil, one-half ($\frac{1}{2}$) ounce paraffin, one beeswax and one (1) ounce boracic acid. These substances are heated together sufficiently to cause them to melt and inter-mingle thoroughly, and when the mass is cooled it is semi-solid.

To apply the composition, the eggs are smeared therewith, thus forming a thin coat or skin of the preserving material over the whole surface, so that evaporation is prevented, and access of the oxygen of the air to the contents of the egg is cut off. After some three months the coat or skin disappears, it being in part taken up or absorbed by the wrappers of tissue paper.

After an egg has been smeared with the composition, as above stated, it is wrapped in common or plain wrapping papers, and placed in an egg case, and the latter then placed in a dry cellar or other place of storage.

The composition penetrates and fills the pores of the shells, and the comparatively solid elements, to wit: ox fat, paraffin, and beeswax have sufficient adhesive quality to retain their hold in the pores while the boracic acid imparts a desirable and antiseptic quality without impairing the efficacy of the other elements. The combination of olive oil with the boracoic acid prevents any musty smell or taste at the end of eight to twelve months, even in a temperature as high as 80° or 90° F. This has been demonstrated as entirely true.

Thus eggs to which my preserver is applied may be safely put on the market for sale at the end of months of storage and not distinguishable from fresh-laid eggs, so that they may be poached like the latter.

What I claim is:

The improved egg-preserving composition formed of ox fat, olive oil, beeswax, paraffin and boracic acid, substantially in the proportions stated.

ROBERT GEORGE FLEMING, SR.

Witnesses:
 LEONE POPE,
 MILLARD BOICE.

Copies of this patent may be obtained for five cents each, by addressing the "Commissioner of Patents, Washington, D. C."